United States Patent
Rowe et al.

[11] 3,928,102
[45] Dec. 23, 1975

[54] JOINING OPTICAL WAVEGUIDES

[75] Inventors: Stephen Henry Rowe, Bristol; John Charles Bass, Northampton; Robert Charles Goodfellow, Blisworth, all of England

[73] Assignee: Plessey Handel und Investments A.G., Essex, England

[22] Filed: Dec. 7, 1972

[21] Appl. No.: 313,012

[30] Foreign Application Priority Data
Dec. 22, 1971  United Kingdom............... 59845/71

[52] U.S. Cl................ 156/158; 65/4 B; 65/DIG. 7; 156/304; 264/1; 264/248; 264/261; 350/96 C
[51] Int. Cl.²................... B29D 11/00; B65H 69/02
[58] Field of Search............ 264/1, 174, 261, 248.9; 350/96 C; 156/158, 296, 304; 65/4 B, DIG. 7

[56] References Cited
UNITED STATES PATENTS

| | | | |
|---|---|---|---|
| 2,218,909 | 10/1940 | Gill, Jr. | 264/1 |
| 3,717,531 | 2/1973 | Smith | 156/180 |

*Primary Examiner*—Robert F. White
*Assistant Examiner*—Gene Auville
*Attorney, Agent, or Firm*—Scrivener Parker Scrivener & Clarke

[57] ABSTRACT

A method of joining two optical fibres in which both are held parallel to a reference line by surface tension of a liquid, and alignment is achieved by transmitting light along one fibre and rotating the other until the light received thereby attains a maximum. While still held by surface tension, the fibres are joined at their ends by the application of an adhesive or heat. A reference line may be established on a flat surface by placing a third fibre in liquid spread over the surface and subjecting the fibre to tension.

15 Claims, 6 Drawing Figures

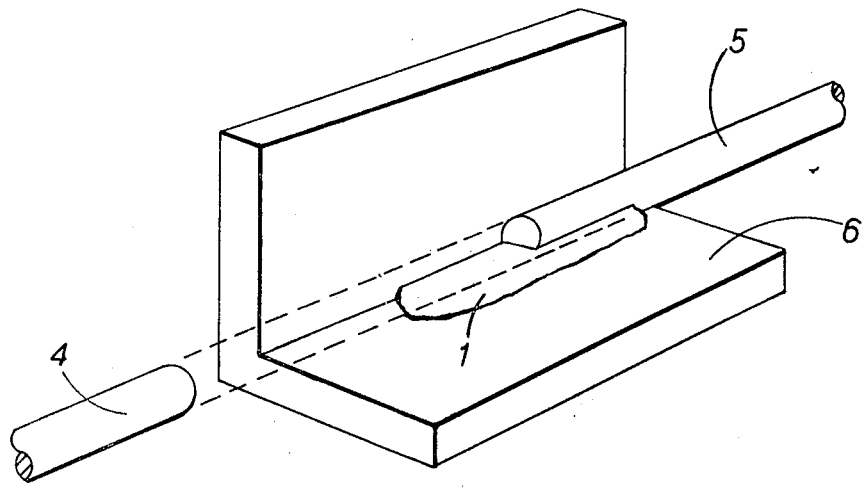
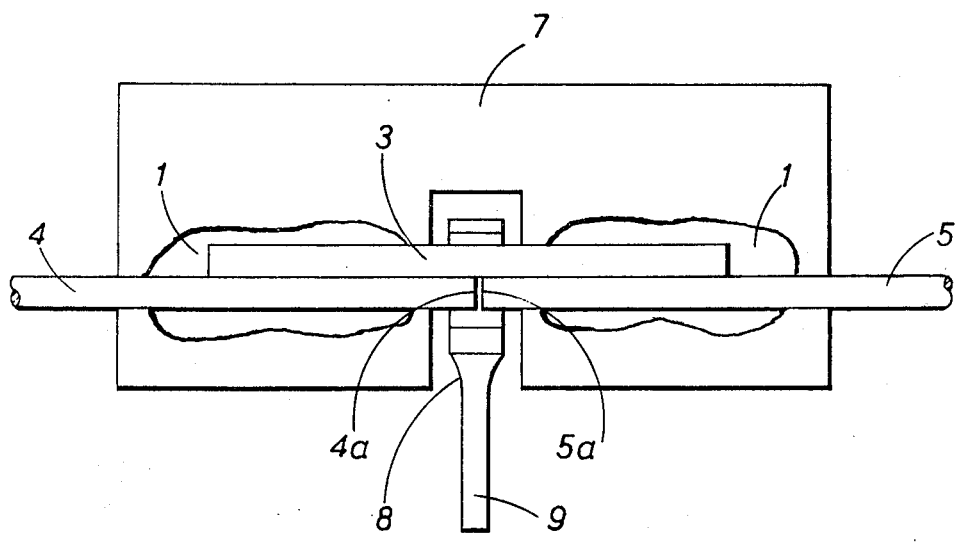
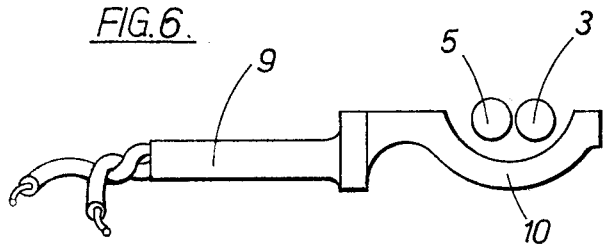

JOINING OPTICAL WAVEGUIDES

This invention relates to optical waveguides and is concerned with the problem of joining one guide to another.

Optical waveguides comprise one or more optical fibres along which light is transmitted by internal reflection. When two fibres have to be joined to each other, accurate alignment is essential if light is not to be lost at the joint. Since the thickness of an optical fibre approximates to that of a human hair, the alignment process gives rise to difficulties.

According to the invention there is provided a method of joining a first optical fibre end-to-end with a second optical fibre which includes providing a reference line, holding the two fibres parallel to the reference line by surface tension of a liquid, adjusting the alignment of the fibres while so held, and joining the fibres to each other while held in the adjusted positions by the surface tension of the liquid. Conveniently but not necessarily, the liquid has adhesive properties which are employed to join the fibres together.

Figure 1:
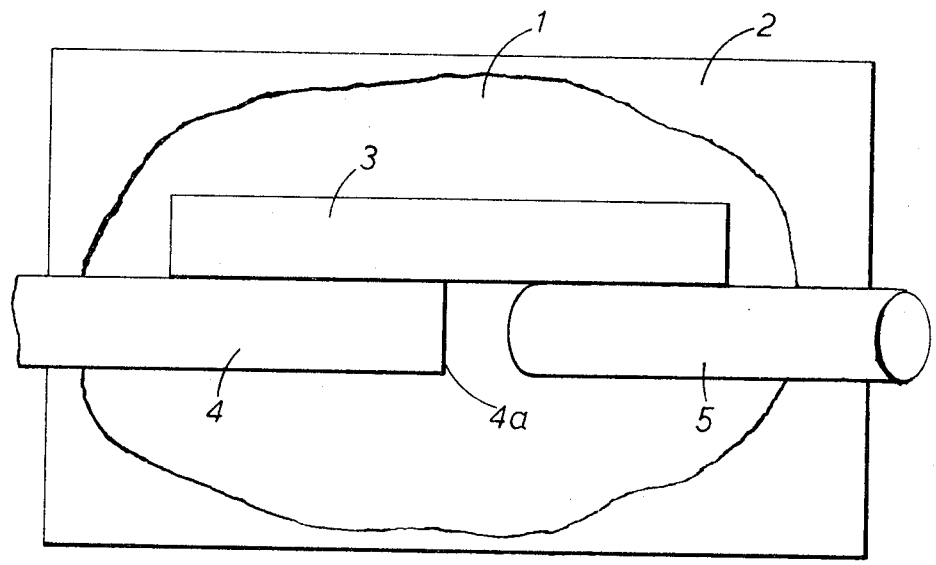
Figure 2:
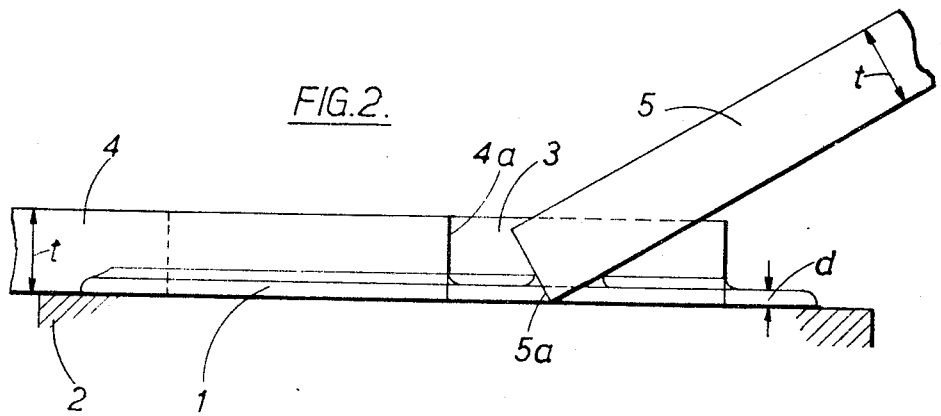
Figure 3:
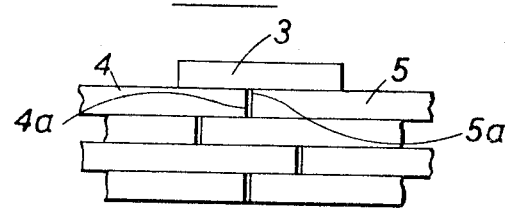

The invention will now be described with reference to the accompanying drawings in which:

FIG. 1 is a plan view, to a greatly exaggerated scale, of an intermediate stage of the process according to the invention, FIG. 2 is a side view corresponding to FIG. 1, FIG. 3 is a plan view, to a less exaggerated scale, of a multiple joint, FIG. 4 is a perspective view of a cornered work table, FIG. 5 is a plan view of a flat work table for use if heat bonding is employed, FIG. 6 shows apparatus for applying heat if heat bonding is employed.

To join two optical fibres together, a quantity of liquid 1 is placed on a flat work table 2, which conveniently may be a microscope slide. The liquid is spread over the table 2 until its depth $d$ (FIG. 2) is less than the thickness $t$ (FIG. 2) of the fibres to be used. A short length 3 of fibre is placed in the liquid on the table, and is caused to lie in an approximately straight line by a brief application of tension along its longitudinal axis. The straightened fibre 3 is held on the table 2 by the surface tension of the liquid 1. The line taken up by the fibre 3 is used as a reference.

The end of one 4 of the fibres 4, 5 which are to be joined to each other is laid on the table 2 in the liquid 1, so as to touch and lie parallel with the reference fibre 3, the end face 4a of the fibre 4 being positioned near the mid-point of the reference fibre. The liquid 1 has a viscosity such that the fibre 4 can be manipulated in the manner described. Once manipulated against the reference fibre 3, the fibres 3, 4 are held against each other on the table 2 by the surface tension of the liquid 1. The end of the other fibre 5 is then introduced into the liquid 1 at an angle to the table 2, as shown most clearly in FIG. 2. The end face 5a of the fibre 5 is moved close to the end face 4a of the fibre 4. The fibre 5 is then laid on the table 2 so as to touch and lie parallel with the reference fibre 3. The fibres 4, 5 are now lying end-to-end on the table 2. Since both the fibres 4, 5 are parallel to the reference fibre 3, the fibres 4, 5 are approximately in alignment. The fibres 4, 5 are held in approximate alignment by the surface tension of the liquid 1.

The alignment of the fibres 4, 5 is next adjusted in any suitable way. Conveniently light is transmitted along one of the fibres, and the quantity of light received by the other fibre is measured. One of the fibres is then rotated about its longitudinal axis until the measurement reaches a maximum. When the measurement is at its maximum, the fibres 4, 5 are in alignment. Further, if the fibres 4, 5 are not circular in cross section, the measurement will only reach its maximum if the fibres are aligned and the peripheries of their end faces 4a, 5a coincide. This method of adjustment is therefore independent of the cross sectional shape of the fibres 4, 5. When the adjustment has been completed, the fibres 4, 5 are held in their adjusted positions by the surface tension of the liquid 1.

The viscosity of the liquid 1 must be such as not to impede the adjustment process. With the end faces 4a, 5a of the fibres close to each other, some or all of the space between them may be invaded by the liquid 1 on account of capillary action. If transmission is not to be interfered with, the liquid 1 should have optical characteristics, notably transparency and refractive index, must be compatible with those of the fibres 4, 5.

The alignment of the fibres 4, 5 having been adjusted, and with the fibres held in their adjusted positions by the surface tension of the liquid 1, the stage has been reached for the joining of the fibres 4, 5. The joining may be effected in any suitable way. One convenient way is to employ adhesion. Two methods of employing adhesion are appropriate. In the first method, joining is effected by applying a liquid adhesive to the fibres 4, 5 near their end faces 4a, 5a, and allowing the adhesive to set. With this method, the liquid 1 must not evaporate before the adhesive has set. Further, if the end faces 4a, 5a are not accurately cut, the applied adhesive may enter the space between them, possibly displacing some of the liquid 1. If this possibility is to be catered for, the adhesive must be optically compatible with the fibres 4, 5. In the second method, the liquid 1 has adhesive properties, and joining is effected merely by allowing the liquid to set, a small quantity of additional liquid being added if required to ensure a strong mechanical joint. In the first method, paraffin and cedar oil are examples of liquids which may be used as the liquid 1. The adhesive which is added in this method may be the liquid known as "Eastman 910".

The reference fibre 3 adheres to the completed joint, any optical coupling occasioned by the fibre 3 being negligible. Where a joint involves many fibres, a single reference fibre may suffice, each pair of ends, after being joined, serving as a reference fibre for the next pair. Preferably the joints are staggered as shown in FIG. 3, where a joint is indicated by double lines such as 4a, 5a. Adhesion will occur between the joints and the work table 2. This however is not disadvantageous since the table 2 may be used as a mounting plate for the finished joints, and afford some protection to the joints from the effects of impact and mechanical strain.

The reference fibre 3 may be dispensed with if a cornered work table 6 (FIG. 4) is used instead of the flat work table 2. The liquid 1 is applied to the inner angle of the corner, which serves as a reference line. The fibres 4, 5, which are to be joined, are laid in this angle, where they are held parallel to the reference line by the surface tension of the liquid 1. The rest of the joining process follows as already described.

Instead of adhesion, heat bonding may be employed to join the fibres 4, 5 together. If this is contemplated, a flat work table 7 (FIG. 5) is used which has a central gap 8 across which the reference fibre 3 is bridged. The reference fibre 3 is straightened and is held in its straightened form by the surface tension of a liquid 1 applied to the work table 7 on each side of the gap 8. The fibres 4, 5 are then laid alongside and parallel to the reference fibre 3, with their end faces 4a, 5a close to each other near the centre of the gap 8. The fibres 4, 5 are moved into contact with the reference fibre 3, and are held in this position by the surface tension of the liquid 1. The fibres 4, 5 are now in approximate alignment. Adjustment of alignment follows as previously described, the fibres 4, 5 being held in their adjusted positions by the surface tension of the liquid 1. Heat is now applied to the fibres 4, 5 near their end faces 4a, 5a which bond together. Conveniently the heat is applied by a heating tool 9 which enters the gap 8. As shown in FIG. 6 a suitable heating tool 9 has a trough 10 which, during the heating process, is held in the gap 8 underneath the ends of the fibres 4, 5.

What is claimed is:

1. A method of joining a first optical fibre end-to-end with a second optical fibre which includes providing a reference line, placing the first and second fibres so as to touch and lie parallel to the reference line and holding said fibers so positioned by surface tension of a liquid, adjusting the alignment of the first and second fibres while so held, and joining the first and second fibres to each other while held in the adjusted positions by the surface tension of the liquid.

2. A method as claimed in claim 1 in which the reference line is provided by spreading said liquid over a flat work table, placing a reference optical fibre on the work table in the liquid, the thickness of the fibre exceeding the depth of the liquid, and straightening the fibre by applying tension thereto.

3. A method as claimed in claim 1 in which the reference line is provided by the angle of an angled work table.

4. A method as claimed in claim 1 in which the reference line is provided by means of a flat work table which has a central slot, by spreading said liquid on the table at opposite sides of the slot, by placing a reference optical fibre on the table across the slot, the fibre resting in the liquid at each side of the slot, the thickness of the fibre exceeding the depth of the liquid, and by applying tension to the fibre.

5. A method as claimed in claim 2 in which the first optical fibre is placed in said liquid and is held against and parallel to the reference fibre by surface tension of the liquid; and in which the second optical fibre is introduced to said liquid at an angle inclined to the surface of the work table, the second fibre being subsequently moved until its end is adjacent to an end of the first fibre, the second fibre being then laid on the work table where it is held against and parallel to the reference fibre by surface tension of the liquid.

6. A method as claimed in claim 3 in which the first optical fibre is placed in the angle of the work table and is held parallel to the reference line by surface tension of the liquid; and in which the second optical fibre is introduced to said liquid at an angle inclined to both surfaces of the angled work table, the second fibre being subsequently moved until its end is adjacent to an end of the first fibre, the second fibre being then laid in the angle of the work table where it is held parallel to the reference line by surface tension of the liquid.

7. A method as claimed in claim 5 in which the alignment of the first and second fibres is adjusted by transmitting light along one of the fibres and rotating the other fibre until the quantity of light received thereby attains a maximum value.

8. A method as claimed in claim 6 in which the alignment of the first and second fibres is adjusted by transmitting light along one of the fibres and rotating the other fibre until the quantity of light received thereby attains a maximum value.

9. A method as claimed in claim 7 in which the said liquid has adhesive properties, the first and second fibres being joined to each other by allowing the liquid to set.

10. A method as claimed in claim 8 in which the said liquid has adhesive properties, the first and second fibres being joined to each other by allowing the liquid to set.

11. A method as claimed in claim 7 in which a liquid adhesive is applied to the ends of the first and second fibres while the fibres are held in the aligned position by surface tension.

12. A method as claimed in claim 8 in which a liquid adhesive is applied to the ends of the first and second fibres while the fibres are held in the aligned position by surface tension.

13. A method as claimed in claim 4 in which the first and second fibres are placed in said liquid at opposite sides of the slot with their ends adjacent to each other over the slot, each fibre being held against and parallel to the reference fibre by surface tension of the liquid.

14. A method as claimed in claim 13 in which the alignment of the first and second fibres is adjusted by transmitting light along one of the fibres and rotating the other fibre until the quantity of light received thereby attains a maximum value.

15. A method as claimed in claim 14 in which the first and second fibres are joined to each other by applying heat to the fibres at the slot in the work table.

* * * * *